(12) United States Patent
Shin (10) Patent No.: US 7,797,110 B2
(45) Date of Patent: Sep. 14, 2010

(54) METHOD FOR VELOCITY ANALYSIS USING WAVEFORM INVERSION IN LAPLACE DOMAIN FOR GEOPHYSICAL IMAGING

(75) Inventor: Changsoo Shin, Seoul (KR)

(73) Assignee: Shin's Geophysics, Kwanak-Gu, Seoul (KR)

( * ) Notice: Subject to any disclaimer, the term of this patent is extended or adjusted under 35 U.S.C. 154(b) by 410 days.

(21) Appl. No.: 11/942,352

(22) Filed: Nov. 19, 2007

(65) Prior Publication Data

US 2009/0006000 A1    Jan. 1, 2009

Related U.S. Application Data

(60) Provisional application No. 60/946,321, filed on Jun. 26, 2007.

(51) Int. Cl.
G01V 1/30 (2006.01)
G01V 1/28 (2006.01)
G01V 1/34 (2006.01)
G06F 19/00 (2006.01)

(52) U.S. Cl. .......................... 702/11; 73/594; 181/101; 367/14; 367/38; 702/16; 702/189

(58) Field of Classification Search .................. 73/570, 73/584, 594; 181/101, 108; 367/14, 37, 367/38; 702/1, 6, 11, 14, 16, 17, 18, 127, 702/187, 189
See application file for complete search history.

(56) References Cited

U.S. PATENT DOCUMENTS

| | | | | |
|---|---|---|---|---|
| 4,464,737 A | * | 8/1984 | Pann | 367/49 |
| 4,592,031 A | * | 5/1986 | Bradshaw et al. | 367/45 |
| 4,926,392 A | * | 5/1990 | Handley et al. | 367/59 |
| 4,980,866 A | * | 12/1990 | Wang et al. | 367/52 |
| 5,583,825 A | * | 12/1996 | Carrazzone et al. | 367/31 |
| 6,021,092 A | * | 2/2000 | Paffenholz et al. | 367/24 |
| 6,865,489 B2 | * | 3/2005 | Jing | 702/16 |

OTHER PUBLICATIONS

Van De Sype, David M., et al.; Title: Small-Signal z-Domain Analysis of Digitally Controlled Converters; IEEE Transactions on Power Electronics; vol. 21, No. 2; Mar. 2006; pp. 470-478.

Kim, Jeong Ho, et al.; Title: 3-D Seismic Imaging using High-Performance Parallel Direct Solver for Large-Scale Finite Element Analysis; Proceedings of the Eighth International Conference on High-Performance Computing in Asia-Pacific Region; IEEE; 2005; pp. 8 pgs.

Pratt, R. Gerhard; Title: Seismic Waveform Inversion in the Frequency Domain, Part 1: Theory and Verification in a Physical Scale Model; Geophysics; vol. 64, No. 3; May-Jun. 1999; pp. 888-901.

* cited by examiner

*Primary Examiner*—Edward R Cosimano
(74) *Attorney, Agent, or Firm*—Conley Rose, P.C.; J. Robert Brown, Jr.

(57) ABSTRACT

A Laplace transform system comprising a processor, a measured time domain wavefield, a velocity model, and Laplace damping constants, wherein the processor is programmed to calculate a substantially about zero frequency component of a Fourier transform of a time domain damped wavefield, wherein the time domain damped wavefield is damped by the Laplace damping constants to obtain long wavelength velocity information for deeper subsurface regions.

24 Claims, 7 Drawing Sheets

METHOD FOR VELOCITY ANALYSIS USING WAVEFORM INVERSION IN LAPLACE DOMAIN FOR GEOPHYSICAL IMAGING

CROSS-REFERENCE TO RELATED APPLICATIONS

The present application claims priority to expired U.S. Provisional Patent Application Ser. No. 60/946,321, filed Jun. 26, 2007 by Shin and entitled "Method for Velocity Analysis Using Waveform Inversion in Laplace Domain," which is incorporated by reference herein as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Seismic imaging is used for various purposes, such as for searching for subsurface oil and gas reservoirs. In seismic imaging, a physical subsurface image or a related subsurface information model, such as the velocity model, is constructed from collected seismic measurement data. One type of collected seismic measurement data is prestack reflection data in the time domain. Generally, to collect prestack reflection data, acoustic or elastic waves are sent into the underground using a number of specialized sources. The sources are typically dispersed over the top surface to cover a certain area of interest. The reflected seismic waves from the subsurface are then collected at the top surface using a number of specialized receivers that cover the area of interest. The subsurface image, or the related velocity model, is then constructed by processing the prestack reflection data in some form.

Recently, with the rapid development of computing hardware, mathematical waveform inversion of prestack reflection data has reemerged as one form of processing to generate subsurface information from an initial guess model. Waveform inversion of prestack reflection data has been attempted in both the time domain and the frequency domain, arriving to no conclusions on which approach is best. Both approaches have been applied with degrees of success to synthetic data generated by known theoretical benchmark models. However, a successful implementation of waveform inversion for real collected prestack reflection data remains elusive. One obstacle for a successful implementation is the absence of low frequency components in real data, which makes it difficult to resolve long wavelength velocity models. Another reason that prevents a successful waveform inversion of real data is the possibility of non-unique solutions for subsurface images or velocity models.

SUMMARY

In one embodiment, a Laplace transform system is provided comprising a processor, a measured time domain wavefield, a velocity model, and Laplace damping constants, wherein the processor is programmed to calculate a substantially about zero frequency component of a Fourier transform of a time domain damped wavefield, wherein the time domain damped wavefield is damped by the Laplace damping constants to obtain long wavelength velocity information for deeper subsurface regions.

In another embodiment, a Laplace domain inversion system is provided. The system comprises a processor; a damped recorded wavefield in a Laplace domain; a wave equation; an objective function; and a velocity model, wherein the processor is programmed to solve the wave equation in the Laplace domain, minimize the objective function, and calculate the velocity model that corresponds to the damped recorded wavefield to analyze subsurface regions.

In still another embodiment, a method is provided for analyzing subsurface regions, comprising receiving collected prestack reflection data in a time domain; transforming the time domain prestack reflection data to Laplace domain reflection data; initializing a preliminary velocity model that represents a subsurface structure; calculating one of a logarithmic, an integral, and a power objective function; verifying whether the objective function satisfies a convergence criterion; updating the velocity model if the convergence criterion is not met; and generating a subsurface image from the velocity model if the convergence criterion is met to analyze subsurface regions.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a waveform inversion method in the Laplace domain for constructing a subsurface velocity model from prestack reflection data. A wavefield in the Laplace domain may be equivalent to a zero or near zero frequency component of a damped wavefield in the time domain. Therefore, an inversion of a wavefield in the Laplace domain may share similar properties of waveform inversion with the zero or near zero frequency component of an undamped wavefield in the time domain. The waveform inversion for the zero or near zero frequency component of an undamped wavefield in the time domain may be equivalent to inverting a Poisson's equation. Thus, such as the case of inverting a Poisson's equation, the waveform inversion in the Laplace domain may be robust and may resolve long wavelength velocity models. In comparison to waveform inversion in the frequency domain, the Laplace domain inversion method may result in a smoother logarithmic, integral, or power objective function, wherein the method converges to a correct solution even if the initial velocity model is far from the true model. Furthermore, the waveform inversion in the Laplace domain may be optimized by adjusting the damping constant in order to resolve deep or shallow parts of the velocity model. Decreasing the damping constant of the wavefield may be suitable for resolving a long wavelength velocity model for deeper regions, and increasing the damping constant may be better suited for resolving the velocity model from shallower regions.

Figure 1:
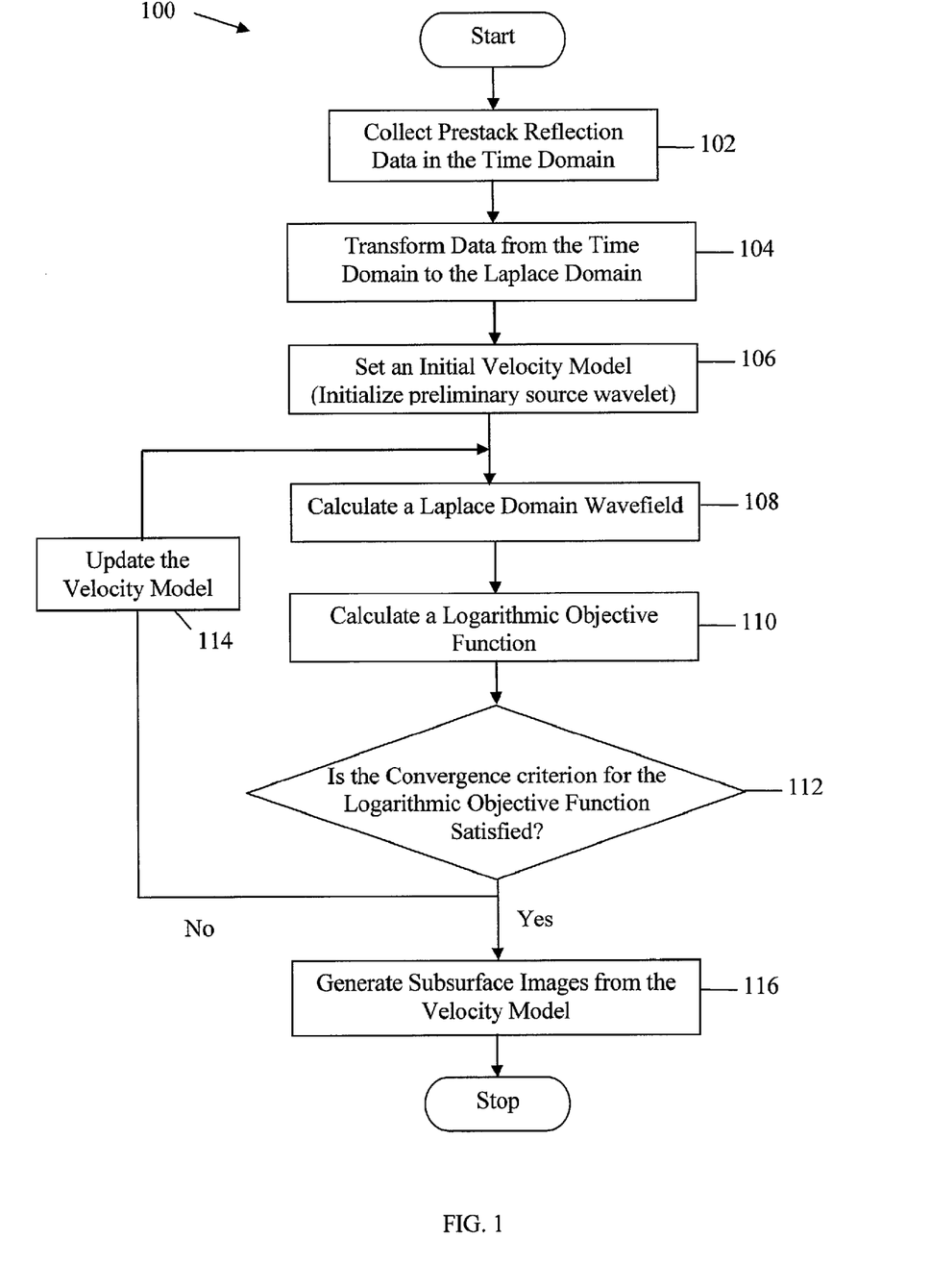
FIG. 1 illustrates an embodiment of a Laplace domain waveform inversion method.
Figure 1A:
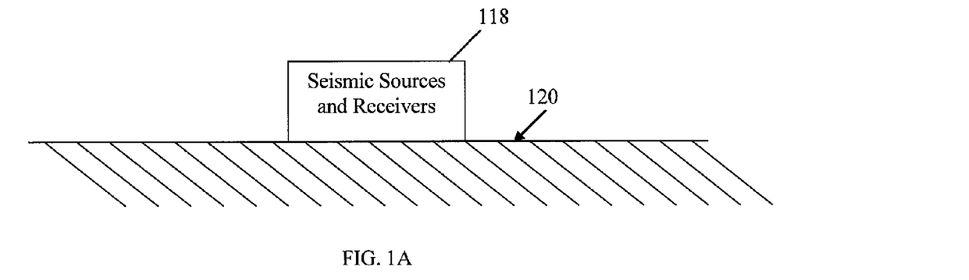
FIG. 1A illustrates an embodiment of seismic sources and seismic receivers on the surface of a geological site of interest.

FIG. 1 illustrates an embodiment of a Laplace domain waveform inversion method 100. FIG. 1A illustrates an embodiment of seismic sources and seismic receivers 118 on the surface of a geological site of interest 120. The Laplace domain waveform inversion method 100 may receive collected prestack reflection data in the time domain that represents a true underground structure. The Laplace domain waveform inversion method 100 may transform the time domain prestack reflection data to Laplace domain reflection data. The Laplace domain waveform inversion method 100 may initialize a preliminary velocity model that represents the subsurface structure based on predetermined factors. The method 100 may then use both the Laplace transformed collected data and the preliminary velocity model to calculate a logarithmic, integral, or power objective function, which is a measure of the degree of similarity between the collected data and modeled data corresponding to the preliminary velocity model. The method 100 may then verify if the logarithmic, integral, or power objective function satisfies a convergence criterion. If the logarithmic, integral, or power objective function does not satisfy the convergence criterion, the previous velocity model may be updated and then used along with the Laplace transformed data to calculate a new logarithmic, integral, or power objective function. The method 100 may check again if the new logarithmic, integral, or power objective function satisfies the convergence criterion. If the convergence criterion is not satisfied, the process of updating the velocity model and calculating a new logarithmic, integral, or power objective function may be repeated. Once the logarithmic, integral, or power objective function satisfies the convergence criterion, the iteration ends and the last updated velocity model may represent accurately the true subsurface velocity model. The method 100 may use the final velocity model to generate a subsurface image and the method ends. As well as calculating the velocity model, in some embodiments, a source wavelet that may be calculated. Each of the blocks of the Laplace domain waveform inversion method 100 is discussed in detail below.

The Laplace domain waveform inversion method 100 begins at block 102 by collecting prestack reflection data in the time domain from a seismic survey. The prestack reflection data may be collected by distributing seismic sources and receivers 118 over a chosen survey area of interest 120. The prestack reflection data may be obtained when the seismic sources transmit controlled time pulses of acoustic or elastic energy, which travel through a medium such as water or layers of rocks and are then reflected or refracted, diffracted, or scattered onto the receivers. The Laplace domain waveform inversion method 100 then proceeds to block 104.

At block 104, the Laplace domain waveform inversion method 100 may transform the reflected wavefield collected in the time domain to reflection data in the Laplace domain. The Laplace transform of a time domain wavefield u(t) is defined as $$u(s) = \int_0^\infty u(t)e^{-st}dt, \tag{1}$$

where s is a real Laplace damping constant, and t is an instance in time. The product u(t) $e^{-st}$ in equation (1) may represent a damped time domain wavefield at a given Laplace damping constant, s. Furthermore, the Laplace transformed wavefield u(s) may represent the zero or near zero frequency component of the Fourier transform of the time domain damped wavefield by introducing a complex frequency $$u(s, \omega) = \lim_{\omega \to 0} \int_{-\infty}^\infty U(s, t)e^{-i\omega t}dt \tag{2}$$
$$\cong \int_{-\infty}^\infty U(s, t)dt,$$

Figure 2A:
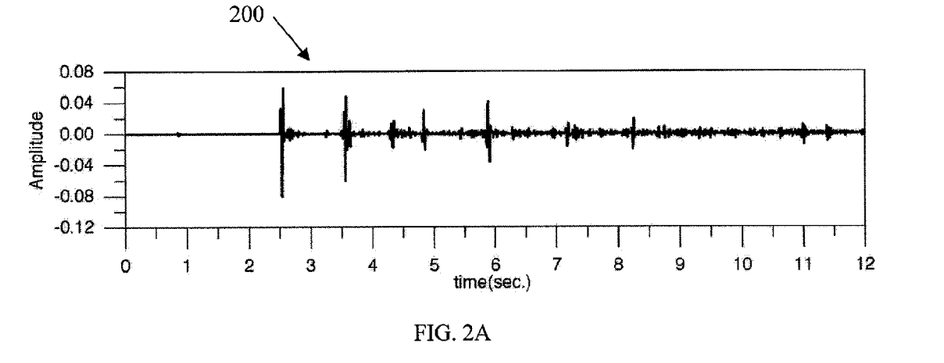
FIG. 2A illustrates an embodiment of an undamped time domain wavefield.
Figure 2B:
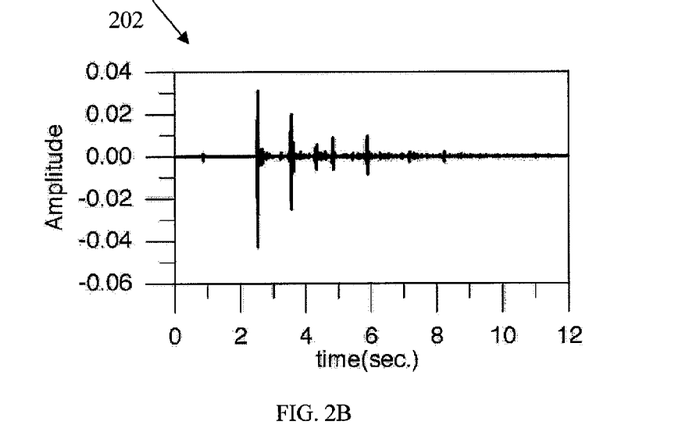
FIG. 2B illustrates an embodiment of a damped time domain wavefield.
Figure 2C:
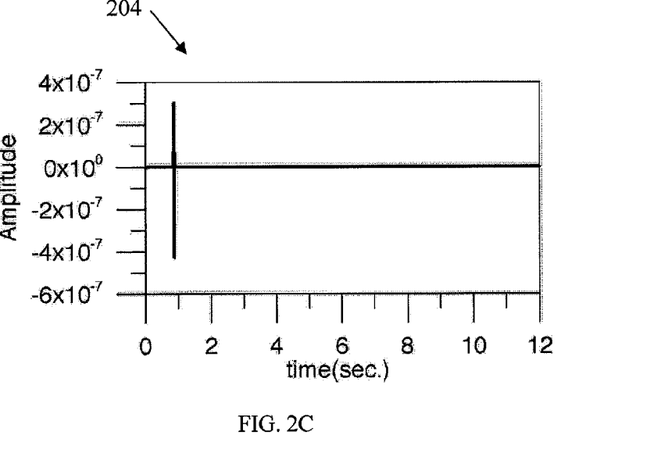
FIG. 2C illustrates another embodiment of a damped time domain wavefield.

Where, ω is the complex frequency, U(s,t)=u(t) $e^{-st}$ is the time domain damped wavefield. FIG. 2A illustrates an embodiment of an undamped time domain wavefield 200. The time domain wavefield 200 that represents the prestack reflection data may contain multiple sharp peaks (and dips), which correspond to reflections from multiple layers under the surface. Damping the time domain wavefield 200 using a damping constant may reduce the number of visible peaks (and dips) in the wavefield, wherein the peaks (and dips) that correspond to later instances of time may be more heavily damped than those that correspond to earlier instances of time. As a result, the tail portion of the wavefield, or alternatively the latter peaks (and dips), may be significantly attenuated or even totally eliminated. The degree of attenuation of the latter peaks (and dips), as well as the extent of time over which they remain visible, may be dependent on the size of the damping constant. FIG. 2B illustrates an embodiment of a damped wavefield 202 obtained by damping the initially undamped wavefield 200 of FIG. 2A, using a relatively small damping constant (s=0.25). For such a weakly damped wavefield 202, a considerable number of peaks (and dips) may remain visible at the earlier instances of time. FIG. 2C illustrates another damped wavefield 204 obtained by damping the wavefield 200 using a much larger damping constant (s=10). In such case, the damping constant is sufficiently large so that the damped wavefield 204 may appear like a delta wave train where its peak amplitude resides at the first arrival instance of time, estimated around 1 second. Signal noises in advance of the first arrival event of the wavefield may be muted before transforming the time domain reflected wavefield to reflection data in the Laplace domain. After transforming the time domain reflected wavefield to reflection data in the Laplace domain, the method 100 proceeds to block 106.

At block 106, the Laplace domain waveform inversion method 100 may initialize an estimated velocity model that is assumed to resemble, in general properties at least if not in shape, the velocity model of the true collected wavefield data. In an embodiment, initializing an estimated velocity model may include initializing a preliminary source wavelet, as also shown at block 106. The initial velocity model may be estimated using two-dimensional or three-dimensional wave velocity models, and by making some assumptions about the subsurface structure. The method 100 then progresses to block 108.

At block 108, the Laplace domain waveform inversion method 100 may calculate the Laplace wavefield that corresponds to the initial estimated velocity model. The wavefield in the time domain may be calculated using the wave equation $$M\ddot{u}+Ku=f, \quad (3)$$

where M is a mass matrix, K is a stiffness matrix, ü is a wavefield in the time domain, u is the second-order time derivative of u, and f is a source vector. In order to calculate however the wavefield in the Laplace domain, a hybrid Laplace and Fourier transform of equation (3) with proper boundary conditions may be considered instead $$S\tilde{u}=\tilde{f}, \quad (4)$$

where $$S = -M\omega^2 + K,$$

$$\tilde{u} = \int_0^\infty u(t)e^{-i\omega t}dt,$$

$$\tilde{f} = \int_0^\infty f(t)e^{-i\omega t}dt,$$

and ω is a complex frequency that may be expressed as $$\omega=\omega_{small}^*-is, \quad (5)$$

where $\omega_{small}$ may be less than $1/T_{max}$, wherein $T_{max}$ is a maximum observed record length in time, s is a positive damping constant, and i is equal to $\sqrt{-1}$. The Laplace domain wavefield ũ may be a real valued Laplace domain wavefield or a complex values Laplace domain wavefield. The real valued Laplace domain wavefield may be calculated by choosing $\omega_{small}^*$ equal to zero. The complex valued Laplace domain wavefield may be calculated by choosing $\omega_{small}^*$ equal to a constant value and choosing s appropriately. In an embodiment, the Laplace domain wavefield ũ may be solved by a method comprising first factoring the matrix S, and second using a simple forward or backward substitution to obtain ũ in the Laplace domain. The Laplace domain wavefield ũ may also be solved by other methods known to persons of ordinary skill in the art. If the Laplace damping constant s is set to zero, then the Laplace domain wave equation (4) may be considered a Poisson's equation, which is known to provide smooth inversion results. Once a Laplace domain wavefield is calculated, the method 100 proceeds to block 110.

At block 110, the method 100 may calculate a logarithmic, integral, or power objective function. The solution of the wave equation in the Laplace domain may be equivalent to the integration of the damped wavefield for a given Laplace damping constant. The wavefield in the Laplace domain may be so small that the waveform inversion using a logarithmic, integral or power wavefield may be most effective. Hence, an objective function may be considered that is based on the exponent ratio of the estimated wavefield in the Laplace domain, ũ, to the true wavefield in the Laplace domain, d̃

$$E_{logarithm} = \sum_{s=1}^{Nfrq}\sum_{i=1}^{Nsrc}\sum_{j=1}^{Nrcv}\{\ln(\tilde{u}_{ij}(s))-\ln(\tilde{d}_{ij}(s))\}^2 \quad (6)$$

$$= \sum_{s=1}^{Nfrq}\sum_{i=1}^{Nsrc}\sum_{j=1}^{Nrcv}\left\{\ln\left(\frac{\tilde{u}_{ij}(s)}{\tilde{d}_{ij}(s)}\right)\right\}^2,$$

$$E_{integral} = \sum_{s=1}^{Nfrq}\sum_{i=1}^{Nsrc}\sum_{j=1}^{Nrcv}\left\{\int_{p_1}^{p_2}\tilde{u}_{ij}(s)^p dp - \int_{p_1}^{p_2}\tilde{d}_{ij}(s)^p dp\right\}^2,$$

$$E_{power} = \sum_{s=1}^{Nfrq}\sum_{i=1}^{Nsrc}\sum_{j=1}^{Nrcv}\{\tilde{u}_{ij}(s)^p - \tilde{d}_{ij}(s)^p\}^2,$$

where Nfreq is the number of Laplace damping constants considered, Nsrc and Nrcv is the number of seismic receivers and seismic sources used to collect the wavefield data, respectively, and p may vary from 0 to 1 and may be bounded by $p_1$, and $p_2$, where $p_2>p_1$. The logarithmic, integral, or power objective function expressed in equation (6) may represent the summed squares (or squares of absolute values of complex wavefield) of all differences between the logarithmic, integral or power values of the Laplace estimated wavefield and the Laplace true wavefield, which may be collected from all sources and receivers.

At block 112, the Laplace domain waveform inversion method 100 may examine the logarithmic, integral, or power objective function to verify if a convergence criterion of the objective function value is met. In an embodiment, the convergence criterion may be met if the logarithmic, integral, or power value is found equal to zero or below a certain minimum that may be considered negligible. In another embodiment, the convergence criterion may be met if the value of the logarithmic, integral, or power objective function at the final iteration of the method 100 may be equal or within a negligible distance in value to the logarithmic, integral, or power objective function obtained in the preceding iteration. If the convergence criterion is not satisfied, then the method 100 proceeds to block 114, otherwise the method 100 proceeds to block 116.

At block 114, the method 100 may update the estimated velocity model by adding an adjusting value to the previously estimated velocity model of a prior iteration. In an embodiment, the adjusting value may be obtained by the steepest-descent method or the Gauss-Newton method. The steepest-descent method may resolve the adjusting values of the velocity model by seeking to minimize the logarithmic, integral, or power objective function. Minimizing the logarithmic, integral, or power objective function may be accomplished by solving for the velocity model value that renders the derivative value of the logarithmic, integral, or power objective equal to zero. The adjusting value may also be obtained by other optimization methods know to persons of ordinary skill in the art. After updating the estimated velocity model value, the method 100 proceeds to block 108 where a new Laplace domain wavefield may be calculated and then used to recalculate the logarithmic, integral, or power objective function. The recalculated objective function may again be checked against the convergence criterion to determine whether or not the method 100 may exit the loop.

At block 116 of method 100, the subsurface image may be generated using the final updated velocity model that meets the convergence criterion of the objective function. When the logarithmic, integral, or power objective function converges to a minimum, the final updated velocity model may be identical or sufficiently close to the true velocity model, which corresponds to the true collected Laplace domain wavefield data. Hence, the accurately estimated velocity model may be used with prestack depth migration models, know to persons of ordinary skill in the art, to reconstruct realistic subsurface images.

In order for the waveform inversion to be successful with real data, a smooth and long wavelength velocity model should be recovered, which may be difficult to attain with conventional time domain or frequency domain waveform inversion. Retrieving the long wavelength velocity model may be a challenge due to exponentially increasing noise in lower frequency components of real collected seismic data. As shown above, the wave equation in the Laplace domain of equation (4) may be equivalent to a Poisson's equation. Hence, the waveform inversion in the Laplace domain may resemble the inversion of Poisson's equation, which provides smooth inversion results. The wavefield in the Laplace domain may also be closely associated with the velocity distribution, where a wavefield damped with a small Laplace constant may contain information of deep parts of the velocity model. In contrast, a wavefield damped with a large Laplace constant may show distinct responses at shallow parts of the velocity model. Since, the small Laplace damping constant may enable resolving a long wavelength velocity model for deep regions, the Laplace constant should be properly chosen in the waveform inversion of the Laplace domain.

As shown in equation (1), the Laplace transform of a time domain wavefield may be numerically calculated by integrating the damped wavefield in the limit of maximum recording time, using some numerical integration scheme, such as a trapezoidal integration technique. However, since the true analytic Laplace transform is an integration of the damped wavefield to the infinite time, a discrepancy or an integration error may be encountered between the analytic and the numerical integration. The amplitude of the damped wavefield at a large Laplace damping constant may be neglected for long recording time, where the integration error may be acceptable. In the case of a small Laplace damping constant, the amplitude of the damped wavefield may remain significant even for longer recording times. Hence, the error of the numerical integration at small Laplace damping constants to the finite maximum time may not be acceptable. Numerical tests of the Laplace transform for synthetic and real data may be made in order to choose an optimal lowest limit of the Laplace damping constant for waveform inversion. A Laplace damping constant substantially about zero is found to be the lowest tolerated limit that may result in negligible integration errors. In other embodiments, other constants may be used. The present disclosure is not limited to method 100 and blocks 102-116, and these steps or processes may be performed in the order provided in method 100, or in a different order. In some embodiments, the method might further include initializing a preliminary wavelet and updating a source wavelet. Also in other embodiments, various blocks 102-116 may be omitted or combined with other steps or processes known to those skilled in the art, all of which is within the scope of the present disclosure.

Figure 1B:
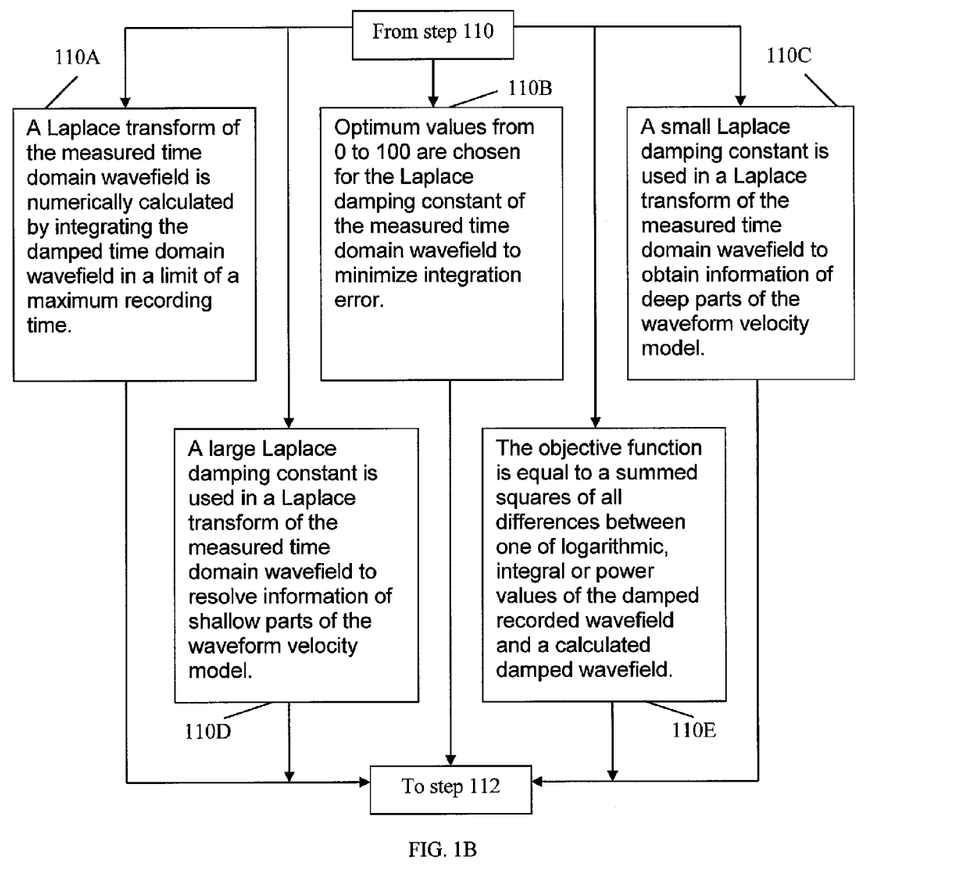
FIG. 1B illustrates embodiments of the Laplace domain waveform inversion method described with respect to FIG. 1.

FIG. 1B illustrates embodiments of the Laplace domain waveform inversion method described with respect to FIG. 1. Each of the different embodiments in FIG. 1B is described above. Each of the different embodiments in FIG. 1B may be optional in some embodiments, and as few as zero or as many as all of them may be used together. Although each of the different embodiments in FIG. 1B are shown as proceeding from step 110 and continue at step 112, each of the different embodiments in FIG. 1B may be part of or in addition to step 110 of FIG. 1, as described above.

In an embodiment, a Laplace transform of the measured time domain wavefield is numerically calculated by integrating the damped time domain wavefield in a limit of a maximum recording time (block 110A). In an embodiment, optimum values from 0 to 100 are chosen for the Laplace damping constant of the measured time domain wavefield to minimize integration error (block 110B). In an embodiment, a small Laplace damping constant is used in a Laplace transform of the measured time domain wavefield to obtain information of deep parts of the waveform velocity model (block 110C). In an embodiment, a large Laplace damping constant is used in a Laplace transform of the measured time domain wavefield to resolve information of shallow parts of the waveform velocity model (block 110D). In an embodiment, the objective function is equal to a summed squares of all differences between one of logarithmic, integral or power values of the damped recorded wavefield and a calculated damped wavefield (block 110E).

Figure 1C:
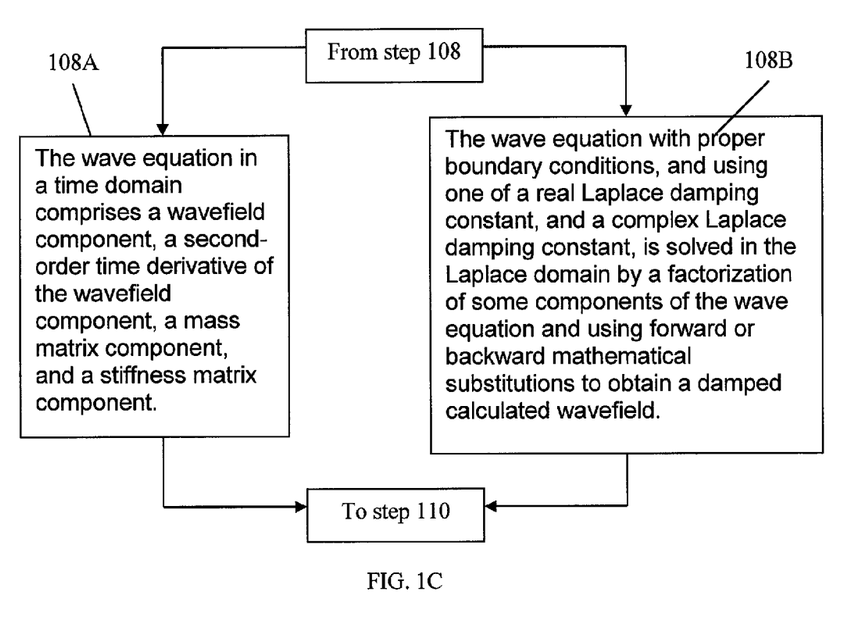
FIG. 1C illustrates embodiments of the Laplace domain waveform inversion method described with respect to FIG. 1.

FIG. 1C illustrates embodiments of the Laplace domain waveform inversion method described with respect to FIG. 1. Each of the different embodiments in FIG. 1C is described above. Each of the different embodiments in FIG. 1C may be optional in some embodiments, and as few as zero or as many as all of them may be used together. Although each of the different embodiments in FIG. 1C are shown as proceeding from step 108 and continue at step 110, each of the different embodiments in FIG. 1C may be part of or in addition to step 108 of FIG. 1, as described above.

In an embodiment, the wave equation in a time domain comprises a wavefield component, a second-order time derivative of the wavefield component, a mass matrix component, and a stiffness matrix component (block 108A). In an embodiment, the wave equation with proper boundary conditions, and using one of a real Laplace damping constant, and a complex Laplace damping constant, is solved in the Laplace domain by a factorization of some components of the wave equation and using forward or backward mathematical substitutions to obtain a damped calculated wavefield (block 108B).

Figure 1D:
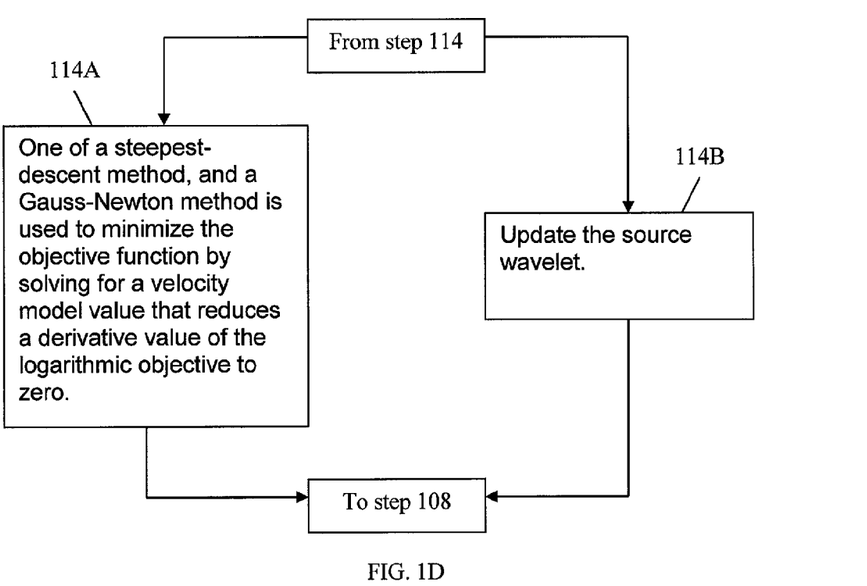
FIG. 1D illustrates embodiments of the Laplace domain waveform inversion method described with respect to FIG. 1.

FIG. 1D illustrates embodiments of the Laplace domain waveform inversion method described with respect to FIG. 1. Each of the different embodiments in FIG. 1D is described above. Each of the different embodiments in FIG. 1D may be optional in some embodiments, and as few as zero or as many as all of them may be used together. Although each of the different embodiments in FIG. 1D are shown as proceeding from step 114 and continue at step 108, each of the different embodiments in FIG. 1D may be part of or in addition to step 114 of FIG. 1, as described above.

In an embodiment, one of a steepest-descent method, and a Gauss-Newton method is used to minimize the objective function by solving for a velocity model value that reduces a derivative value of the logarithmic objective to zero (block 114A). In an embodiment, the method may further include updating the source wavelet (block 114B).

Figure 1E:
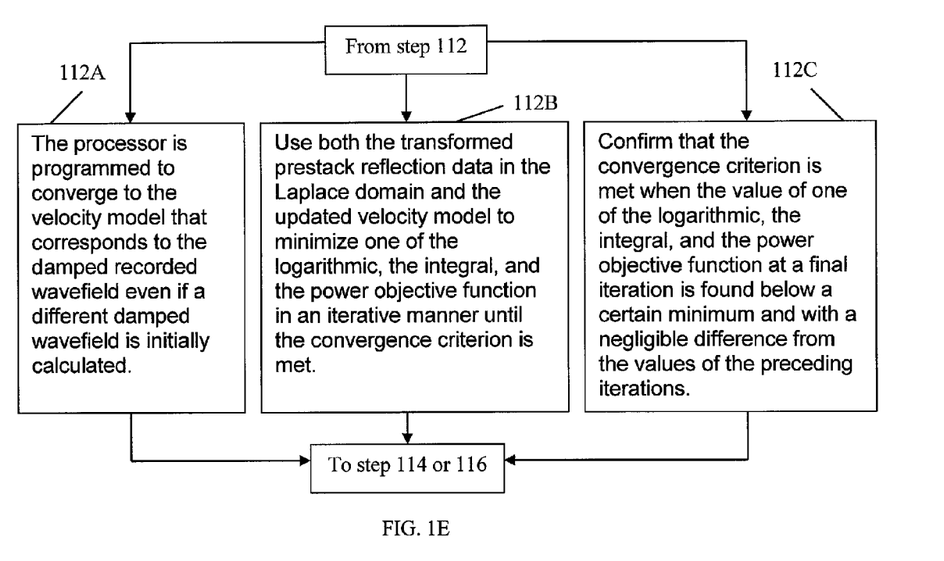
FIG. 1E illustrates embodiments of the Laplace domain waveform inversion method described with respect to FIG. 1.

FIG. 1E illustrates embodiments of the Laplace domain waveform inversion method described with respect to FIG. 1.

Each of the different embodiments in FIG. 1E is described above. Each of the different embodiments in FIG. 1E may be optional in some embodiments, and as few as zero or as many as all of them may be used together. Although each of the different embodiments in FIG. 1E are shown as proceeding from step 112 and continue at either step 114 or 116, each of the different embodiments in FIG. 1E may be part of or in addition to step 112 of FIG. 1, as described above.

In an embodiment, the processor is programmed to converge to the velocity model that corresponds to the damped recorded wavefield even if a different damped wavefield is initially calculated (block 112A). In an embodiment, the method may further include using both the transformed prestack reflection data in the Laplace domain and the updated velocity model to minimize one of the logarithmic, the integral, and the power objective function in an iterative manner until the convergence criterion is met (block 112B). In an embodiment, the method may further include confirming that the convergence criterion is met when the value of one of the logarithmic, the integral, and the power objective function at a final iteration is found below a certain minimum and with a negligible difference from the values of the preceding iterations (block 112C).

Figure 1F:
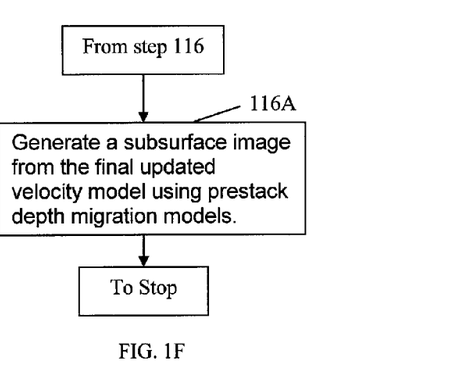
FIG. 1F illustrates embodiments of the Laplace domain waveform inversion method described with respect to FIG. 1.

FIG. 1F illustrates an embodiment of the Laplace domain waveform inversion method described with respect to FIG. 1. The embodiment in FIG. 1F is described above. The embodiment in FIG. 1F may be optional in some embodiments. Although the embodiment in FIG. 1F are shown as proceeding from step 116 and continue to stop, the embodiment in FIG. 1F may be part of or in addition to step 116 of FIG. 1, as described above. In this embodiment, the method may include generating a subsurface image from the final updated velocity model using prestack depth migration models.

Figure 3:
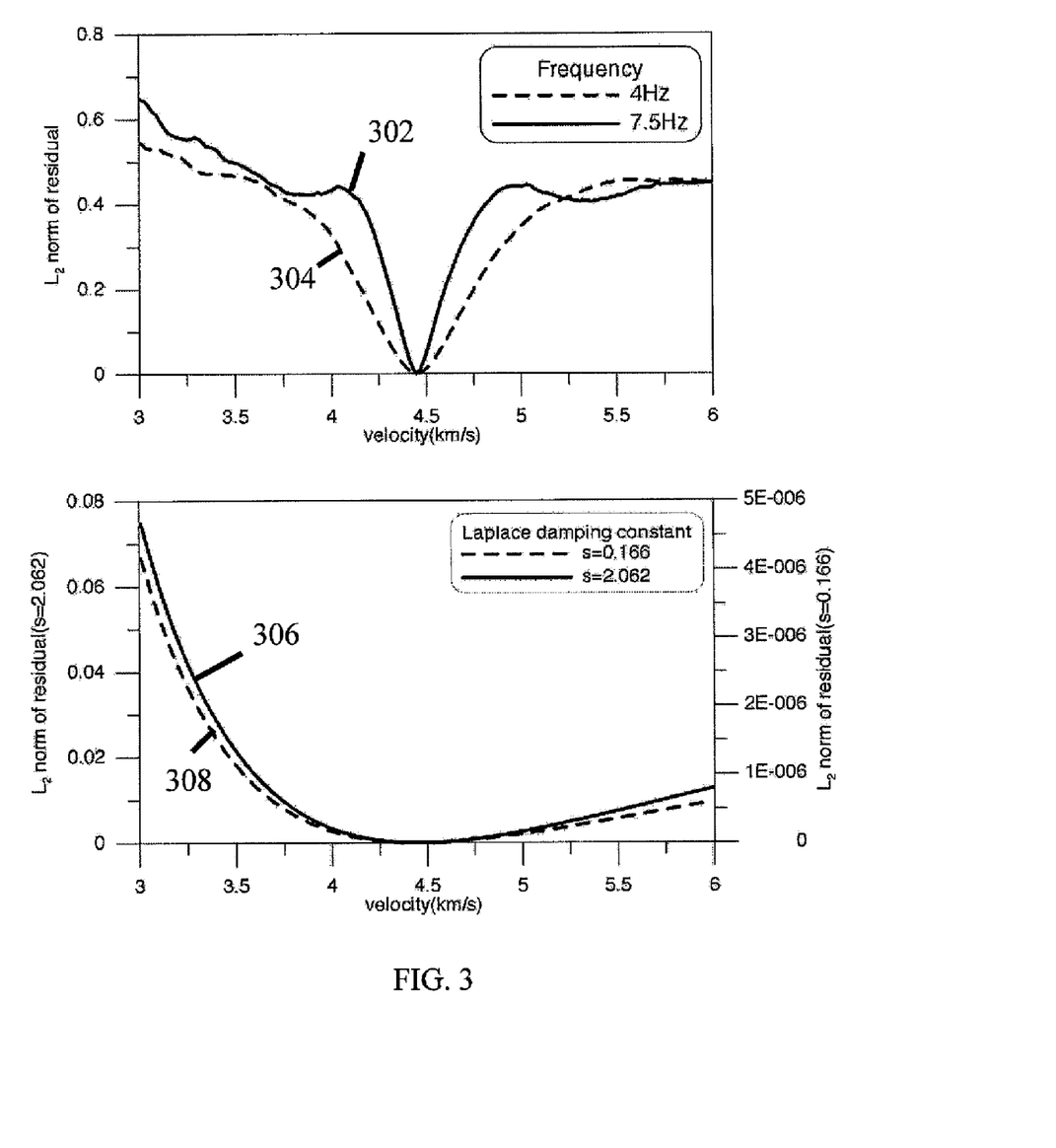
FIG. 3 illustrates an embodiment of objective functions.

FIG. 3 illustrates an embodiment of objective functions in the frequency domain, 302 and 304, and objective functions in the Laplace domain, 306 and 308. All objective functions are generated for a 2D velocity profile A-A' of the SEG/EAGE 3D Salt model, where varying wavefields with velocities from 3 kilometer per second (km/s) to 6 km/s are calculated in both the frequency domain and the Laplace domain. The objective functions in the figure represent the summed squares of the logarithmic differences in values between the true Laplace domain wavefield and the Laplace domain wavefield corresponding to varied velocities. A plurality of local minimum points on both sides of the global minimum point may be observed for the objective function 302 in the frequency domain at 7.5 Hz. The objective function 304 at 4 Hz, on the other hand, appears smoother with a smaller number of local minimum points, compared with that at 7.5 Hz. Unlike the objective functions in the frequency domain, the global minimum point at 4.45 km/s may be located for the objective function 306 with a 0.166 Laplace damping constant and for the objective function 308 with a 2.062 Laplace damping constant. Both objective functions have a similar hyperbolic shape characterized by the absence of local minimum points. Similar observations may also be made for objective functions of other velocity models in the Laplace domain. As a result of the smooth behavior and the absence of local minima in the Laplace domain objective functions, the waveform inversion in the Laplace domain may be more robust, when compared with that of the frequency domain. Because of the well-shaped behavior of the objective function in the Laplace domain the resolved results from the inversion may converge even if an initial model may be far from the true model.

Figure 4:
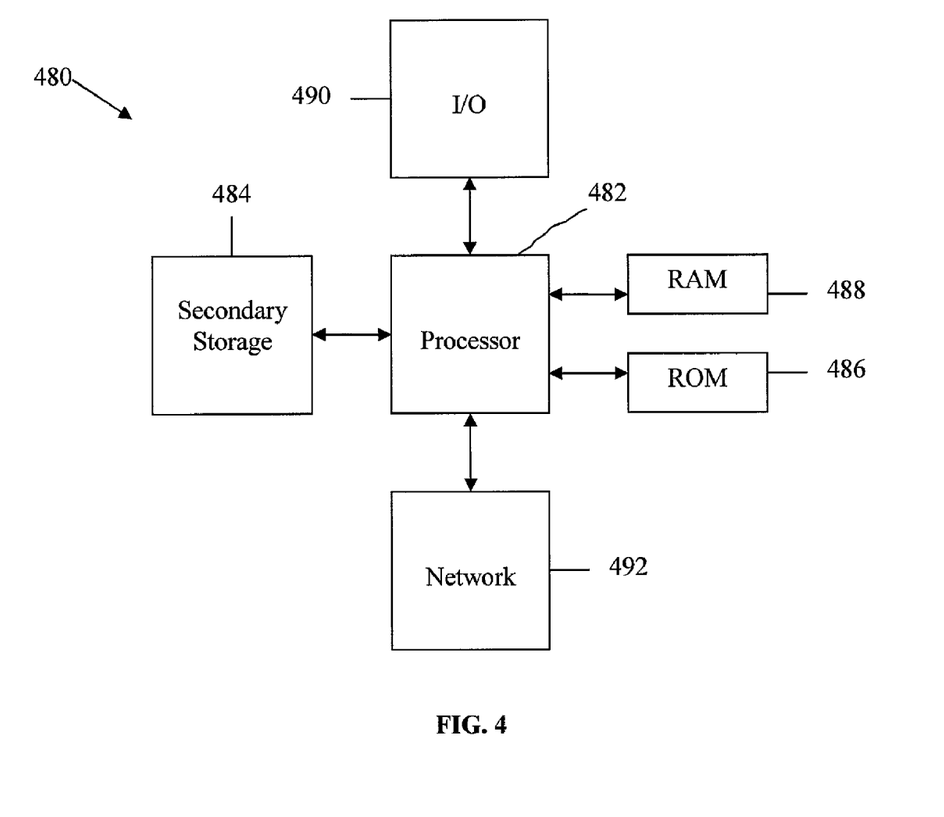
FIG. 4 illustrates an exemplary general-purpose computer system suitable for implementing the several embodiments of the disclosure.

FIG. 4 illustrates a typical, general-purpose computer system suitable for implementing one or more embodiments disclosed herein, such as but not limited to method 100 described above. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A processor configured to execute a Laplace transform system comprising:
    a measured time domain wavefield;
    a velocity model; and
    Laplace damping constants, wherein the processor is programmed to calculate a substantially about zero frequency component of a Fourier transform of a time domain damped wavefield, wherein the time domain damped wavefield is damped by the Laplace damping constants to obtain long wavelength velocity information for deeper subsurface regions.

2. The processor of claim 1 wherein a Laplace transform of the measured time domain wavefield is equivalent to a Poisson's equation when the Laplace damping constant is equal to zero.

3. The processor of claim 1 wherein the measured time domain wavefield is measured using seismic sources and receivers on a surface of a geological site of interest.

4. The processor of claim 1 wherein the measured time domain wavefield is prestack reflection data from subsurface structure.

5. The processor of claim 1 wherein a Laplace transform of the measured time domain wavefield is numerically calculated by integrating the damped time domain wavefield in a limit of a maximum recording time.

6. The processor of claim 1 wherein optimum values from 0 to 100 are chosen for the Laplace damping constant of the measured time domain wavefield to minimize integration error.

7. The processor of claim 1 wherein a small Laplace damping constant is used in a Laplace transform of the measured time domain wavefield to obtain information of deep parts of the waveform velocity model.

8. The processor of claim 1 wherein a large Laplace damping constant is used in a Laplace transform of the measured time domain wavefield to resolve information of shallow parts of the waveform velocity model.

9. A processor configured to execute a Laplace domain inversion system comprising:
    a damped recorded wavefield in a Laplace domain;
    a wave equation;
    an objective function; and
    a velocity model, wherein the processor is programmed to solve the wave equation in the Laplace domain, minimize the objective function, and calculate the velocity model that corresponds to the damped recorded wavefield to analyze subsurface regions.

10. The processor of claim 9 further comprising a source wavelet, wherein the processor is programmed to calculate the source wavelet and the velocity model.

11. The processor of claim 9 wherein the objective function is one of a logarithmic, an integral, and a power function.

12. The processor of claim 9 wherein the damped recorded wavefield in a Laplace domain is converted from data in a time domain.

13. The processor of claim 9 wherein the wave equation in a time domain comprises a wavefield component, a second-order time derivative of the wavefield component, a mass matrix component, and a stiffness matrix component.

14. The processor of claim 9 wherein the wave equation with proper boundary conditions, and using one of a real Laplace damping constant, and a complex Laplace damping constant, is solved in the Laplace domain by a factorization of some components of the wave equation and using forward or backward mathematical substitutions to obtain a damped calculated wavefield.

15. The processor of claim 9 wherein the objective function is equal to a summed squares of all differences between one of logarithmic, integral or power values of the damped recorded wavefield and a calculated damped wavefield.

16. The processor of claim 9 wherein the objective function is smooth and comprises no local minima or a small number of local minima.

17. The processor of claim 9 wherein one of a steepest-descent method, and a Gauss-Newton method is used to minimize the objective function by solving for a velocity model value that reduces a derivative value of the logarithmic objective to zero.

18. The processor of claim 9 wherein the processor is programmed to iterate starting with an initially calculated damped wavefield.

19. The processor of claim 9 wherein the processor is programmed to converge to the velocity model that corresponds to the damped recorded wavefield even if a different damped wavefield is initially calculated.

20. A method, implemented by one or more processors, for analyzing subsurface regions, comprising:
    receiving, at the one or more processors, collected prestack reflection data in a time domain;
    transforming, by the one or more processors, the time domain prestack reflection data to Laplace domain reflection data;
    initializing, by the one or more processors, a preliminary velocity model that represents a subsurface structure;
    calculating, by the one or more processors, one of a logarithmic, an integral, and a power objective function;
    verifying, by the one or more processors, whether the objective function satisfies a convergence criterion;
    updating, by the one or more processors, the velocity model if the convergence criterion is not met; and
    generating, by the one or more processors, a subsurface image from the velocity model if the convergence criterion is met to analyze subsurface regions.

21. The method of claim 20 further comprising:
    using, by the one or more processors, both the transformed prestack reflection data in the Laplace domain and the updated velocity model to minimize one of the logarithmic, the integral, and the power objective function in an iterative manner until the convergence criterion is met.

22. The method of claim 21 further comprising:

initializing, by the one or more processors, a preliminary source wavelet; and updating, by the one or more processors, the source wavelet.

23. The method of claim 20 further comprising:

confirming, by the one or more processors, that the convergence criterion is met when the value of one of the logarithmic, the integral, and the power objective function at a final iteration is found below a certain minimum and with a negligible difference from the values of the preceding iterations.

24. The method of claim 20 further comprising:

generating, by the one or more processors, a subsurface image from the final updated velocity model using prestack depth migration models.

* * * * *

UNITED STATES PATENT AND TRADEMARK OFFICE
CERTIFICATE OF CORRECTION

PATENT NO.       : 7,797,110 B2
APPLICATION NO.  : 11/942352
DATED            : September 14, 2010
INVENTOR(S)      : Changsoo Shin

It is certified that error appears in the above-identified patent and that said Letters Patent is hereby corrected as shown below:

Column 5, line 24, replace "ü" with -- u --

Column 5, line 25, replace "u" with -- ü --

Signed and Sealed this

Twenty-first Day of December, 2010

David J. Kappos
*Director of the United States Patent and Trademark Office*